(12) United States Patent
Stein

(10) Patent No.: US 12,717,037 B2
(45) Date of Patent: Aug. 25, 2026

(54) METHOD FOR MEASURING A DISTANCE BETWEEN AN OBJECT AND AN OPTICAL SENSOR, CONTROL DEVICE FOR CARRYING OUT SUCH A METHOD, DISTANCE MEASURING APPARATUS COMPRISING SUCH A CONTROL DEVICE, AND MOTOR VEHICLE COMPRISING SUCH A DISTANCE MEASURING APPARATUS

(71) Applicant: Daimler Truck AG, Leinfelden-Echterdingen (DE)

(72) Inventor: Fridtjof Stein, Ostfildern (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 948 days.

(21) Appl. No.: 17/926,412

(22) PCT Filed: Apr. 1, 2021

(86) PCT No.: PCT/EP2021/058733

§ 371 (c)(1),
(2) Date: Nov. 18, 2022

(87) PCT Pub. No.: WO2021/233603

PCT Pub. Date: Nov. 25, 2021

(65) Prior Publication Data

US 2023/0194719 A1 Jun. 22, 2023

(30) Foreign Application Priority Data

May 19, 2020 (DE) ..................... 10 2020 002 994.9

(51) Int. Cl.
*G01S 17/89* (2020.01)
*G01S 17/46* (2006.01)
(Continued)

(52) U.S. Cl.
CPC .............. *G01S 17/89* (2013.01); *G01S 17/46* (2013.01); *G06T 7/70* (2017.01); *G06V 20/58* (2022.01); *G06T 2207/30261* (2013.01)

(58) Field of Classification Search
CPC ......... G01S 17/46; G01S 17/18; G01S 17/931
See application file for complete search history.

(56) References Cited

U.S. PATENT DOCUMENTS 4,727,259 A * 2/1988 Halvis .................. G01S 7/4863 250/559.38
2007/0058038 A1* 3/2007 David .................... G01S 7/483 348/135

(Continued)

FOREIGN PATENT DOCUMENTS

WO WO 2017/009848 A1 1/2017

OTHER PUBLICATIONS

PCT/EP2021/058733, International Search Report dated Jun. 17, 2021 (Two (2) pages).

(Continued)

*Primary Examiner* — Yuqing Xiao
*Assistant Examiner* — Zhengqing Qi
(74) *Attorney, Agent, or Firm* — Crowell & Moring LLP

(57) ABSTRACT

A method for measuring a distance between an object and an optical sensor by an illumination device and the optical sensor. A spatial position of a visible distance region in an observation region of the optical sensor is specified. A captured image of the visible distance region is captured by the optical sensor. A start image line and an end image line of the visible distance region are determined in the captured image. A base point image line is ascertained in the captured image as an image line with a shortest distance to the start image line in which the object can be detected. A distance from the object is ascertained by evaluating an image (Continued)

position of the base point image line relative to the start image line and the end image line while taking account of the spatial position of the visible distance region.

6 Claims, 2 Drawing Sheets

(51) Int. Cl.
*G06T 7/70* (2017.01)
*G06V 20/58* (2022.01)

(56) References Cited

U.S. PATENT DOCUMENTS

| | | | | |
|---|---|---|---|---|
| 2012/0320219 | A1 | 12/2012 | David et al. | |
| 2015/0160340 | A1* | 6/2015 | Grauer | G01S 17/88 356/5.04 |
| 2017/0180713 | A1* | 6/2017 | Trail | G02B 27/0025 |
| 2017/0257617 | A1* | 9/2017 | Retterath | H04N 13/296 |
| 2018/0203122 | A1* | 7/2018 | Grauer | G01S 17/89 |
| 2019/0004149 | A1 | 1/2019 | Mano et al. | |
| 2020/0134853 | A1 | 4/2020 | Milici | |
| 2021/0302550 | A1* | 9/2021 | Dutton | G01S 17/894 |

OTHER PUBLICATIONS

German-language German Office Action issued in German application No. 10 2020 002 994.9 dated Dec. 21, 2020 (Four (4) pages).

* cited by examiner

METHOD FOR MEASURING A DISTANCE BETWEEN AN OBJECT AND AN OPTICAL SENSOR, CONTROL DEVICE FOR CARRYING OUT SUCH A METHOD, DISTANCE MEASURING APPARATUS COMPRISING SUCH A CONTROL DEVICE, AND MOTOR VEHICLE COMPRISING SUCH A DISTANCE MEASURING APPARATUS

BACKGROUND AND SUMMARY OF THE INVENTION

The invention relates to a method for measuring a distance between an object and an optical sensor, a control device configured for carrying out such a method, a distance measuring apparatus comprising such a control device, and a motor vehicle comprising such a distance measuring apparatus.

Methods for measuring a distance between an object and an optical sensor by means of an illumination device and an optical sensor are known. Such a method is found in the international patent application with publication number WO 2017/009848 A1, in which an illumination device and an optical sensor are controlled in a manner temporally coordinated with one another in order to capture a particular visible distance region in an observation region of the optical sensor, wherein the visible distance region arises from the temporal coordination of the control of the illumination device and of the optical sensor.

Ascertaining a base point distance of a detected object in the distance region is problematic, especially if a vehicle in which such a method is carried out experiences inherent pitching, and/or a roadway on which the vehicle is travelling has a roadway course that deviates from a horizontal course or at least has varying angles of attack with respect to the horizontal.

The invention is therefore based on the object of providing a method for measuring a distance between an object and an optical sensor, a control device configured for carrying out such a method, a distance measuring apparatus comprising such a control device and a motor vehicle comprising such a distance measuring apparatus, wherein the stated disadvantages are at least partially redressed and preferably avoided.

The object is solved in particular by providing a method for measuring a distance between an object and an optical sensor by means of an illumination device and the optical sensor. The illumination device and the optical sensor are here controlled in a manner temporally coordinated with one another. A spatial position of a visible distance region in an observation region of the optical sensor is specified here by the temporally coordinated control of the illumination device and of the optical sensor. A captured image of the visible distance region is captured by the optical sensor by means of the coordinated control. A start image line for the beginning of the visible distance region is determined in the captured image. Furthermore, an end image line for the end of the visible distance region is determined in the captured image. A base point image line is determined in the captured image, wherein the base point image line is that image line in which firstly the object can be detected and which secondly has the shortest distance—in the image plane of the optical sensor—to the start image line. Finally, the distance from the object is ascertained by evaluating the image position of the base point image line relative to the start image line and the end image line while taking account of the spatial position of the visible distance region.

It is advantageously possible, by means of the method provided here, to ascertain the distance from the object to the optical sensor, in particular a so-called base point distance or a so-called base point range, with high accuracy and at least largely uninfluenced by an inherent pitching motion of a vehicle in which the method is carried out and/or an angle of attack of a roadway, on which the object is arranged, relative to the horizontal. This is possible in particular because the base point distance of the object is interpolated from the image position of the base point image line relative to the start image line and the end image line in the visible distance region. The spatial position of the visible distance region in real space, i.e., on the object side, is actually known from the temporal control of the illumination device, on the one hand, and of the optical sensor, on the other hand, while, at the same time, the image region of the distance region on the optical sensor is known by ascertaining the start image line, on the one hand, and the end image line, on the other hand. Therefore, when the base point image line is found, the spatial, object-side position of the object within the object-side visible distance region can now advantageously be deduced from the position of the base point image line in the image region, i.e., the image position relative to the start image line and the end image line. In particular, when the angle of attack of the roadway relative to the horizontal is modified—as well as when the angle of the optical sensor to the roadway is altered, for example due to an inherent pitching motion—the image region of the visible distance region on the optical sensor changes significantly, which is readily and inherently taken into account by the method provided here and therefore does not affect the correct result of the evaluation provided here.

The method can particularly advantageously be applied in self-driving vehicles, in particular self-driving trucks. In particular, when driving behind a vehicle that does not have large range requirements, objects arranged in the vehicle's own lane which cannot be driven over can advantageously be detected by means of the method, in particular objects which are small compared to the size of the vehicle. The method enables a prompt and appropriate reaction to the detection of such objects and in particular to the detection of a distance of the vehicle from these objects. Such an appropriate reaction can be, for example, emergency braking or driving along an evasive trajectory, which may be determined ad hoc.

Such small objects which cannot be driven over are typically also referred to as "lost cargo". However, such objects might also be people or animals in the road, possibly as a result of an accident.

The method for generating captured images by means of temporally coordinated control of an illumination device and an optical sensor is in particular a method known as gated imaging; the optical sensor is in particular a camera that is triggered sensitively only in a specific, restricted time period, which is referred to as "gated control". The camera is therefore a gated camera. The illumination device is also correspondingly temporally controlled only in a specific, selected time interval, in order to illuminate a scene on the object side.

In particular, a predefined number of light pulses are emitted by the illumination device, preferably lasting between 5 ns and 20 ns. The beginning and the end of the exposure of the optical sensor is coupled to the number and duration of the light pulses given off. As a result, the optical sensor can detect a specific visible distance region by temporally controlling the illumination device on the one hand and the optical sensor on the other hand, with a correspondingly defined spatial position, i.e., in particular specific distance of the beginning of the distance region from the optical sensor and specific distance region width.

The visible distance region is that—object-side—region in three-dimensional space which is imaged by means of the optical sensor in a two-dimensional captured image on an image plane of the optical sensor by the number and duration of the light pulses of the illumination device in conjunction with the start and the end of the exposure of the optical sensor.

The observation region is, by contrast, in particular the—object-side—region in three-dimensional space which could be imaged as a whole—in particular to the maximum extent—by means of the optical sensor in a two-dimensional captured image given sufficient illumination and exposure of the optical sensor. In particular, the observation region corresponds to the entire exposable image region of the optical sensor that could theoretically be illuminated. The visible distance region is thus a subset of the observation region in real space. Only a subset of the image plane of the optical sensor is accordingly exposed in the method provided here, wherein this subset of the image plane is given in particular between the start image line and the end image line.

In so far as "object-side" is mentioned here and in the following, this refers to a region in real space, i.e., on the sides of the object to be observed. In so far as "image-side" is mentioned here and in the following, this refers to a region on the image plane of the optical sensor. The observation region and the visible distance region are given here on the object side. They correspond to image-side areas on the image plane that are assigned by the laws of imaging and the temporal control of the illumination device and of the optical sensor.

Depending on the start and end of the exposure of the optical sensor after the beginning of the illumination by the illumination device, light pulse photons strike the optical sensor. The further the visible distance region is from the illumination device and the optical sensor, the longer it takes until a photon that is reflected in this distance region strikes the optical sensor. Therefore the temporal distance between an end of the illumination and a beginning of the exposure is extended, the further away the visible distance region is from the illumination device and from the optical sensor.

It is thus possible in particular, according to one configuration of the method, to define the position and spatial width of the visible distance region by appropriate selection of the temporal control of the illumination device, on the one hand, and of the optical sensor, on the other hand.

In an alternative configuration of the method, the visible distance region can be specified, wherein the temporal coordination of the illumination device, on the one hand, and of the optical sensor, on the other hand, is determined therefrom and appropriately specified.

An image line is understood here to mean in particular the set of all pixels of a captured image in the image plane of the optical sensor which lie on a common horizontal line in the image plane.

The illumination device is a laser in a preferred configuration. The optical sensor is a camera in a preferred configuration.

The base point image line is preferably ascertained as follows: object recognition is carried out in the captured image in particular by means of pattern recognition, preferably using a classification algorithm and/or by means of deep learning. If an object is recognised, all image lines in which the object is depicted are ascertained in the captured image on the basis of this recognition or classification. That image line which has the shortest distance to the start image line is then ascertained as base point image line.

The method advantageously enables in particular the distance between the object and the optical sensor to be determined from a single captured image.

Therefore, the distance between the object and the optical sensor is preferably determined from a single captured image. However, it is possible to include a plurality of captured images in the evaluation, in particular in order to reduce a measurement error and/or to increase the accuracy of the distance determination.

One development of the invention provides that, for the captured image of the distance region, a line histogram is created over all of the image lines associated with an evaluation region in the observation region on the optical sensor by means of summing the illumination intensities per image line of the optical sensor. The start image line and the end image line are then determined by means of the line histogram. This advantageously enables the determination of the image position of that region on the optical sensor that is associated on the image side with the object-side visible distance region. To this extent, the temporal control of the illumination device on the one hand and of the optical sensor on the other hand results in a clear brightness transition at the beginning of the image-side distance region and at the end of the image-side distance region. This ultimately enables the object distance to be determined by interpolating the position of the base point image line relative to the start image line and the end image line.

A line histogram is understood here to mean in particular that the individual image lines of the optical sensor in the evaluation region are assigned the sum of the illumination intensities over all pixels of the respective image line that are lying in the evaluation region. In this way, the brightness transition that is correspondingly created by the temporal control can be detected very easily and reliably in the image plane of the optical sensor.

In one preferred configuration, the evaluation region is identical to the observation region. This corresponds to one embodiment of the method that is particularly easy to implement. However, according to another preferred configuration, it is also possible that the evaluation region is selected to be smaller than the observation region, in particular than a region of interest in which the objects to be detected can be found. This advantageously means that the method can be carried out more quickly and efficiently. By only including those pixels that lie in the evaluation region in the summation, the evaluation region can also be limited horizontally in particular.

The evaluation region is preferably identified in the captured image prior to calculating the line histogram by GPS prediction, in particular by back-projecting the course of the road into the image plane, and/or by a method for optical lane tracking.

One development of the invention provides that an object distance is determined as a distance between the object and the optical sensor, wherein a distance region width is determined as difference from the end of the visible distance region and the beginning of the visible distance region. A base point distance is determined as image line distance on the optical sensor between the base point image line and the start image line. Furthermore, a distance region image width is ascertained as image line distance between the end image line and the start image line. The object distance is then finally ascertained as the sum of the beginning of the visible distance region, that is in particular the spatial distance between the beginning of the visible distance region and the optical sensor, and the product of the distance region width with the ratio of the base point distance to the distance region image width. In particular, the object distance is determined according to the following formula:

$$x = x_{near} + (x_{far} - x_{near})\frac{v - v_{near}}{v_{far} - v_{near}} \quad (1)$$

wherein $x_{near}$ is the beginning of the visible distance region, $x_{far}$ is the end of the visible distance region, correspondingly $(x_{far}-x_{near})$ is the distance region width, $v_{near}$ is the start image line, $v_{far}$ is the end image line, and correspondingly $(v_{far}-v_{near})$ is the distance region image width, v is the base point image line, correspondingly $(v-v_{near})$ is the base point distance, and x is the object distance.

This approach is ultimately based on the intercept theorem, wherein two assumptions are required for an application. Firstly, the course of the roadway surface within the visible distance region is assumed to be linear. Secondly, the intercept theorum strictly presupposes that imaginary connecting lines are parallel to each other between the start image line and the beginning of the visible distance region, on the one hand, and the end image line and the end of the visible distance region on the other hand, which is generally not the case. However, the distance between the optical sensor and the visible distance region is generally great enough to be able to assume, at any rate with good approximation, that the corresponding imagined lines are parallel, so that the intercept theorum can be applied with very good approximation at any rate. The result is then that the ratio of the object distance minus the beginning of the visible distance region to the distance region width is equal to the ratio of the base point distance to the distance region image width. This relation is then solved according to the object distance and the abovementioned equation (1) is obtained therefrom.

One development of the invention provides that the illumination device and the optical sensor are each designed for operation in the near infrared range. This has the advantage that the eyes of people and/or animals into which light from the illumination device might fall are not adversely affected. It is particularly advantageous to use a wavelength of more than 1.4 μm, in particular 1.55 μm, since this is strongly absorbed in particular by the lens and the cornea of the eye, so that at most a low intensity falls on the retina. It is also advantageous that other road uses are not dazzled by the illumination device, in particular when driving at night.

One development of the invention provides that a temporal sequence of captured images is created, wherein the temporal coordination of the illumination device and of the optical sensor is altered so that a change in the distance of the object over time is determined. In particular, the temporal coordination for at least two captured images in the temporal sequence of captured images is altered. Particularly preferably, the temporal coordination for each captured image in the temporal sequence is altered. The temporal coordination for the captured images of the temporal sequence are altered in particular such that the base point image line is retained approximately centrally between the start image line and the end image line. The change in the distance of the object over time can in turn be deduced from the change in the temporal coordination of the control of the illumination device and of the optical sensor, which is necessary for this. In this way, advantageously, the distance of the object is measured dynamically.

The object is also solved by providing a control device which is configured for carrying out a method according to the invention or a method according to one of the embodiments described above. The control device is preferably in the form of a computing device, particularly preferably a computer, or control unit, in particular control unit of a vehicle. The advantages that have already been explained in connection with the method apply in particular in connection with the control device.

The object is also solved by providing a distance measuring apparatus which has an illumination device, an optical sensor, and a control device according to the invention or a control device according to one of the exemplary embodiments described above. The advantages that have already been explained in connection with the method and the control device apply in particular in connection with the distance measuring apparatus.

The control device is preferably operatively connected to the illumination device, on the one hand, and to the optical sensor, on the other hand, and is configured for the control thereof.

The object is lastly also solved by providing a motor vehicle having a distance measuring apparatus according to the invention or a distance measuring apparatus according to one of the exemplary embodiments described above. The advantages that have already been explained in connection with the method, the control device and the distance measuring apparatus apply in particular in connection with the motor vehicle.

In an advantageous embodiment, the motor vehicle is designed as a truck. However it is also possible for the motor vehicle to be a passenger motor car, a utility vehicle or another motor vehicle.

The invention is explained in detail below with reference to the drawings.

DETAILED DESCRIPTION OF THE DRAWINGS

Figure 1:
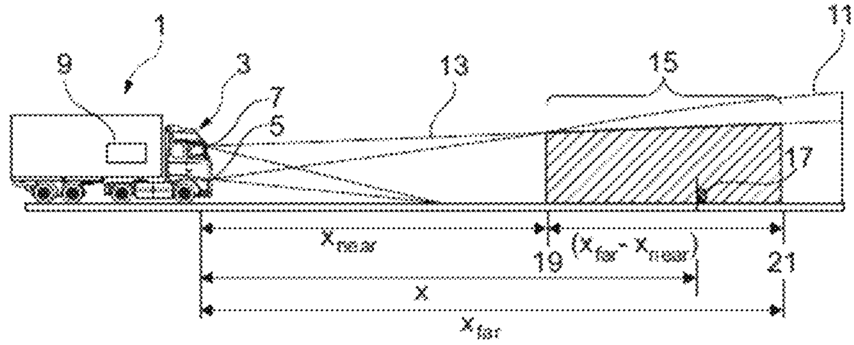
FIG. 1 shows a schematic illustration of one exemplary embodiment of a motor vehicle with one exemplary embodiment of a distance measuring apparatus.

FIG. 1 shows a schematic illustration of one exemplary embodiment of a motor vehicle 1, with one exemplary embodiment of a distance measuring apparatus 3. The distance measuring apparatus 3 has an illumination device 5 and an optical sensor 7. Moreover, the distance measuring apparatus 3 has a control device 9 which is only shown schematically here and, in a manner not shown explicitly, is operatively connected to the illumination device 5 and the optical sensor 7 for the respective control thereof. An illumination frustum 11 of the illumination device 5 and an observation region 13 of the optical sensor 7 are shown in particular in FIG. 1. A visible distance region 15 which results as a subset of the observation region 13 of the optical sensor 7 is also shown in hatched lines.

A object 17 is arranged in the visible distance region 15.

A beginning 19 and an end 21 of the visible distance region 15 are also drawn in FIG. 1.

The control device 9 is configured in particular to carry out an embodiment that is described in more detail below of a method for measuring a distance x between the object 17 and the optical sensor 7.

The illumination device 5 and the optical sensor 7 are controlled in a manner temporally coordinated with one another, wherein a spatial position of the visible distance region 15 in the observation region 13 is specified by the temporally coordinated control of the illumination device 5 and of the optical sensor 7. A captured image of the visible distance region 15 is captured by the optical sensor 7 using the coordinated control.

Figure 2:
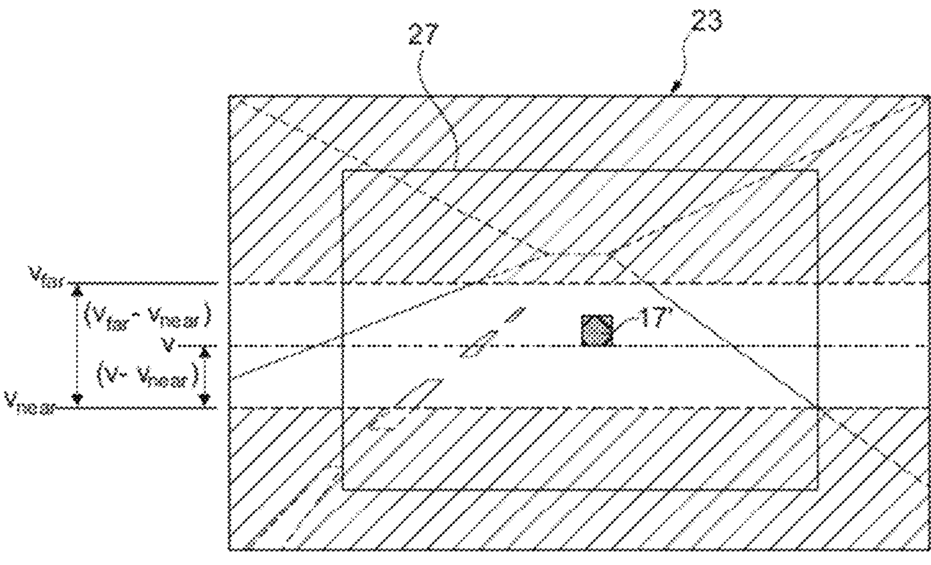
FIG. 2 shows a schematic illustration of a captured image, captured in the context of one embodiment of the method using an optical sensor.

FIG. 2 shows a schematic illustration of such a captured image 23 in an image plane of the optical sensor 7. A start image line $v_{near}$ for the beginning 19 and an end image line $v_{far}$ for the end 21 of the visible distance region 15 in the captured image 23 is illustrated in FIG. 2. The position of this start image line $v_{near}$ and of the end image line $v_{far}$ is determined. A base point image line v is also determined in the captured image 23 as that image line having the shortest distance to the start image line $v_{near}$ in which the object 17 can be detected. The distance of the object 17 is then ascertained by evaluating the image position of the base point image line v, i.e., the position thereof in the captured image 23, relative to the start image line $v_{near}$ and the end image line $v_{far}$ while taking the object-side spatial position of the visible distance region 15 into account.

The image of the object 17 in the captured image 23 is denoted with 17' in FIG. 2.

In addition, an evaluation region 27 which can be determined in particular by a GPS prediction and/or by a method for optical lane tracking is drawn in FIG. 2. As the region of interest, the evaluation region 27 is smaller here than the observation region 13. However, it can also coincide with the latter.

An object distance x—cf. FIG. 1—is determined as distance between the object 17 and the optical sensor 7 in particular, by determining a distance region width ($x_{far}-x_{near}$) as difference from the end 21 of the visible distance region 15 and the beginning 19 of the visible distance region 15. A base point distance ($v-v_{near}$) is determined as image line distance on the optical sensor 7 between the base point image line v and the start image line $v_{near}$. A distance region image width ($v_{far}-v_{near}$) is ascertained as image line distance between the end image line $v_{far}$ and the start image line $v_{near}$. The object distance x is then ascertained as sum of the beginning 19 of the visible distance region 15 and the product of the distance region width ($x_{far}-x_{near}$) with the ratio of the base point distance ($v—v_{near}$) to the distance region image width ($v_{far}-v_{near}$) In particular, the object distance x is ascertained according to Equation (1) given above.

Figure 3:
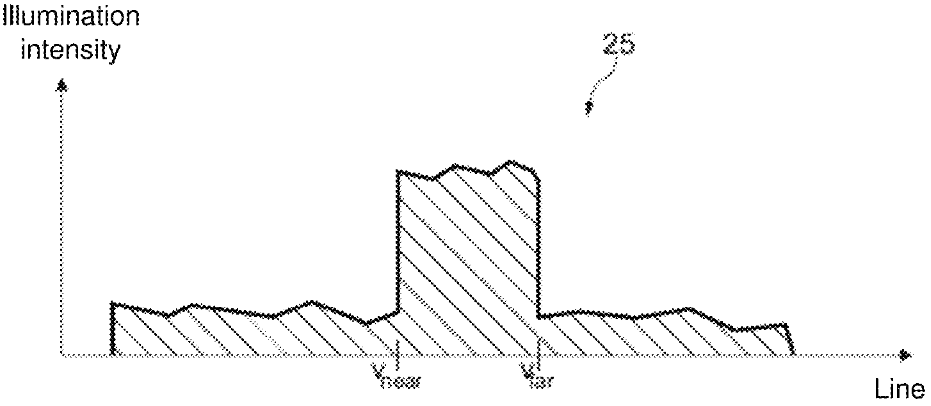
FIG. 3 shows a schematic illustration of a line histogram which is used in one embodiment of the method.

FIG. 3 shows a schematic illustration of a line histogram 25 of the captured image 23 according to FIG. 2 or of the evaluation region 27 of the captured image 23. The individual image lines of the optical sensor 7 are plotted on the x axis in this line histogram 25, with a sum of the illumination intensities per pixel over all pixels of the respective image line in the evaluation region 27 being plotted on the y axis for each image line. This line histogram 25 is created over all image lines assigned to the evaluation region 27 on the optical sensor 7 by summing the illumination intensities per image line of the optical sensor 7. The start image line $v_{near}$ and the end image line $v_{far}$ are then ascertained by means of the line histogram 25, wherein in particular owing to the temporally coordinated control of the illumination device 5 and of the optical sensor 7, significant jumps in intensity in the start image line $v_{near}$ and in the end image line $v_{far}$ can be seen.

The illumination device 5 and the optical sensor 7 are preferably designed for operation in the near infrared range, in particular at 1.55 μm.

In the context of the method, a temporal sequence of captured images 23 is preferably created, wherein the temporal coordination of the illumination device 5 and of the optical sensor 7 is altered so that a change in the distance of the object 17 over time can be determined.

The invention claimed is:

1. A method for measuring a distance between an object and an optical sensor, comprising:

capturing an image of a visible distance region via temporally coordinated control of an illumination device and the optical sensor, wherein a spatial position of the visible distance region in an observation region of the optical sensor is specified by the temporally coordinated control;

determining in the captured image:

a start image line as a beginning of the visible distance region, an end image line as an end of the visible distance region, and a base point image line as an image line with a shortest distance to the start image line in which the object can be detected; and ascertaining the distance between the object and the optical sensor as the sum of: the beginning of the visible distance region and the product of: a distance region width and the ratio of: a base point distance to a distance region image width, wherein the distance region width is from the end of the visible distance region to the beginning of the visible distance region, wherein the base point distance is from the base point image line to the start image line, and wherein the distance region image width is from end image line to the start image line.

2. The method of claim 1, further comprising:

creating for the captured image of the visible distance region a line histogram over all image lines associated with an evaluation region in the observation region by summing illumination intensities per image line of the optical sensor, wherein the start image line and the end image line are determined by the line histogram.

3. The method of claim 1, wherein the illumination device and the optical sensor are configured to operate in a near infrared range.

4. The method of claim 1, further comprising:

creating a temporal sequence of captured images, wherein the temporal coordination is altered such that a change in the distance of the object over time is determined.

5. A device, comprising:

a control unit configured to carry out the method of claim 1.

6. A distance measuring apparatus, comprising:

an illumination device;

an optical sensor; and a control unit configured to carry out the method of claim 1.

* * * * *